US012725271B2

(12) United States Patent
Cai et al.

(10) Patent No.: US 12,725,271 B2
(45) Date of Patent: Sep. 1, 2026

(54) IMAGE QUALITY ENHANCING

(71) Applicant: BEIJING BAIDU NETCOM SCIENCE TECHNOLOGY CO., LTD., Beijing (CN)

(72) Inventors: Jiayin Cai, Beijing (CN); Huaifei Xing, Beijing (CN)

(73) Assignee: BEIJING BAIDU NETCOM SCIENCE TECHNOLOGY CO., LTD., Beijing (CN)

( * ) Notice: Subject to any disclaimer, the term of this patent is extended or adjusted under 35 U.S.C. 154(b) by 737 days.

(21) Appl. No.: 17/836,913

(22) Filed: Jun. 9, 2022

(65) Prior Publication Data

US 2022/0301108 A1 Sep. 22, 2022

(30) Foreign Application Priority Data

Jun. 9, 2021 (CN) ........................ 202110642485.4

(51) Int. Cl.

*G06T 5/00* (2024.01)
*G06T 5/50* (2006.01)
*G06T 5/60* (2024.01)
*G06T 7/194* (2017.01)

(52) U.S. Cl.

CPC ................ *G06T 7/194* (2017.01); *G06T 5/50* (2013.01); *G06T 5/60* (2024.01); *G06T 2207/20012* (2013.01); *G06T 2207/20081* (2013.01); *G06T 2207/20212* (2013.01)

(58) Field of Classification Search

CPC ... G06T 5/00; G06T 5/50; G06T 2207/20012; G06T 2207/20081; G06T 2207/20212; G06T 5/60; G06T 7/11; G06T 7/194; G06T 2207/10024; G06T 2207/20084;

(Continued)

(56) References Cited

U.S. PATENT DOCUMENTS 10,311,324 B1 * 6/2019 Kim ........................ G06N 3/084
10,791,265 B1 * 9/2020 Lambert ................ G06Q 40/08
10,831,417 B1 * 11/2020 Su ......................... G06F 3/1208

(Continued)

FOREIGN PATENT DOCUMENTS

CN 110378852 A 10/2019
CN 110766637 A 2/2020

(Continued)

OTHER PUBLICATIONS

Sketch2Photo: internet image Montage (Year: 2009).*

*Primary Examiner* — Solomon G Bezuayehu
(74) *Attorney, Agent, or Firm* — Seed IP Law Group LLP

(57) ABSTRACT

The present disclosure provides a method and an apparatus for enhancing image quality, a device, and a medium, relates to the field of artificial intelligence and specifically to computer vision and deep learning technologies, and can be applied to an image processing scenario. The method includes: determining an ROI and an RONI in an image to be processed; inputting the ROI to an ROI image quality enhancement model, to obtain first image data output from the ROI image quality enhancement model; inputting the RONI to an RONI image quality enhancement model, to obtain second image data output from the RONI image quality enhancement model; and blending the first image data and the second image data.

14 Claims, 9 Drawing Sheets

(58) Field of Classification Search
CPC ..................... G06T 5/40; G06T 3/4053; G06T 2207/10016; G06V 10/25
See application file for complete search history.

(56) References Cited

U.S. PATENT DOCUMENTS

| | | | | |
|---|---|---|---|---|
| 10,832,046 | B1 * | 11/2020 | Al-Gharaibeh | G06T 5/70 |
| 11,651,229 | B2 * | 5/2023 | Cheng | G06V 10/50 382/118 |
| 2004/0024292 | A1 * | 2/2004 | Menhardt | G06T 7/0012 706/924 |
| 2007/0222894 | A1 * | 9/2007 | Cox | G08B 13/19604 348/E7.069 |
| 2010/0092037 | A1 * | 4/2010 | Peleg | G11B 27/28 382/103 |
| 2013/0022287 | A1 * | 1/2013 | Hooper | G06T 5/94 382/254 |
| 2017/0103534 | A1 * | 4/2017 | Park | A61B 8/4472 |
| 2017/0161569 | A1 * | 6/2017 | Ren | G06V 20/62 |
| 2018/0082407 | A1 * | 3/2018 | Rymkowski | G06T 11/60 |
| 2018/0137605 | A1 * | 5/2018 | Otsuka | G06T 5/70 |
| 2018/0349771 | A1 * | 12/2018 | Kamilov | G06N 3/084 |
| 2019/0130261 | A1 * | 5/2019 | Rallapalli | G06N 3/045 |
| 2019/0205700 | A1 * | 7/2019 | Gueguen | G06T 3/40 |
| 2019/0385177 | A1 * | 12/2019 | Faith | G06Q 30/0201 |
| 2020/0160527 | A1 * | 5/2020 | Rapaka | G06T 7/62 |
| 2020/0258196 | A1 * | 8/2020 | Kokura | G06T 5/50 |
| 2021/0065464 | A1 * | 3/2021 | Goodrich | G06T 19/006 |
| 2021/0142455 | A1 * | 5/2021 | Hsiao | G06T 5/50 |
| 2021/0150676 | A1 * | 5/2021 | Sytnik | G06T 5/73 |
| 2021/0158059 | A1 * | 5/2021 | Kanzawa | G06V 20/64 |
| 2021/0264282 | A1 * | 8/2021 | Collomosse | G06N 3/045 |
| 2021/0304356 | A1 * | 9/2021 | Delattre | G06N 3/09 |
| 2021/0334592 | A1 * | 10/2021 | Taniai | G06V 10/25 |
| 2022/0058332 | A1 * | 2/2022 | Ke | G06F 18/214 |
| 2022/0113795 | A1 | 4/2022 | Eder et al. | |
| 2022/0207750 | A1 * | 6/2022 | Li | G06V 20/58 |
| 2022/0236860 | A1 * | 7/2022 | Lee | G06N 3/08 |
| 2022/0254490 | A1 * | 8/2022 | Addanki | G16H 50/30 |
| 2022/0301302 | A1 * | 9/2022 | Murphy | A01K 79/00 |
| 2023/0419636 | A1 * | 12/2023 | Lin | G06T 7/11 |

FOREIGN PATENT DOCUMENTS

| | | | |
|---|---|---|---|
| CN | 111784623 | A | 10/2020 |
| CN | 112465709 | A | 3/2021 |
| CN | 112801536 | A | 5/2021 |
| JP | 6236731 | B1 | 11/2017 |
| JP | 2020035443 | A | 3/2020 |
| JP | 2020107042 | A | 7/2020 |
| JP | 2020129276 | A | 8/2020 |
| JP | 2020184300 | A | 11/2020 |
| KR | 10-2019-0130478 | A | 11/2019 |

* cited by examiner

IMAGE QUALITY ENHANCING

CROSS REFERENCE TO RELATED APPLICATION

This application claims priority to Chinese Patent Application No. 202110642485.4, filed on Jun. 9, 2021, the contents of which are hereby incorporated by reference in their entirety for all purposes.

TECHNICAL FIELD

The present disclosure relates to the field of artificial intelligence, and specifically to computer vision and deep learning technologies, can be applied to an image processing scenario, and particularly relates to a method and an apparatus for enhancing image quality, a training method and apparatus for an image quality enhancement model, an electronic device, a computer-readable storage medium, and a computer program product.

BACKGROUND

Artificial intelligence is a subject on making a computer simulate some thinking processes and intelligent behaviors (such as learning, reasoning, thinking, planning, etc.) of a human, and involves both hardware-level technologies and software-level technologies. Artificial intelligence hardware technologies generally include technologies such as sensors, dedicated artificial intelligence chips, cloud computing, distributed storage, and big data processing. Artificial intelligence software technologies mainly include the following several general directions: computer vision technologies, speech recognition technologies, natural language processing technologies, and machine learning/deep learning, big data processing technologies, and knowledge graph technologies.

Enhancement of subjective image quality is a popular direction in the field of computer vision, for which methods for enhancing image quality such as noise suppression, edge sharpening, color enhancement, and super-resolution may specifically be used, for image or video processing, thereby improving the viewing experience of users of images or videos. With the growth of computing power and the amount of data, and with the development of deep learning technologies, typically technologies of convolutional neural networks, attention mechanism, etc., new big data-driven and learning-based algorithms are gradually being widely adopted in the industry. Comparing to the conventional methods that rely more on empirical parameters, deep-learning-based methods are more data-driven.

The methods described in this section are not necessarily methods that have been previously conceived or employed. It should not be assumed that any of the methods described in this section is considered to be the prior art just because they are included in this section, unless otherwise indicated expressly. Similarly, the problem mentioned in this section should not be considered to be universally recognized in any prior art, unless otherwise indicated expressly.

SUMMARY

The present disclosure provides a method and an apparatus for enhancing image quality, a training method and apparatus for an image quality enhancement model, an electronic device, a computer-readable storage medium, and a computer program product.

According to an aspect of the present disclosure, a method for enhancing image quality is provided, including: determining a region-of-interest, ROI and a region-of-non-interest RONI in an image to be processed: inputting the ROI to an ROI image quality enhancement model, to obtain first image data output from the ROI image quality enhancement model; inputting the RONI to an RONI image quality enhancement model, to obtain second image data output from the RONI image quality enhancement model; and blending the first image data and the second image data.

According to an aspect of the present disclosure, a training method for an image quality enhancement model is provided, including: determining a first sample ROI and a first sample RONI in a first sample image; obtaining first sample ROI enhanced image data corresponding to the first sample ROI; training a first ROI image quality enhancement model by using the first sample ROI and the first sample ROI enhanced image data; obtaining first sample RONI enhanced image data corresponding to the first sample RONI; and training an RONI image quality enhancement model by using the first sample RONI and the first sample RONI enhanced image data.

According to an aspect of the present disclosure, an apparatus for enhancing image quality is provided, including: a determination unit configured to determine an ROI and an RONI in an image to be processed; an ROI image quality enhancement model configured to output first image data based on an input of the ROI; an RONI image quality enhancement model configured to output second image data based on an input of the RONI; and a blending unit configured to blend the first image data and the second image data.

According to an aspect of the present disclosure, a training apparatus for an image quality enhancement model is provided, including: a determination unit configured to determine a first sample ROI and a first sample RONI in a first sample image; an obtaining unit configured to obtain first sample ROI enhanced image data corresponding to the first sample ROI; and a training unit configured to train a first ROI image quality enhancement model by using the first sample ROI and the first sample ROI enhanced image data, where the obtaining unit is further configured to obtain first sample RONI enhanced image data corresponding to the first sample RONI, and the training unit is further configured to train an RONI image quality enhancement model by using the first sample RONI and the first sample RONI enhanced image data.

According to an aspect of the present disclosure, an electronic device is provided, including: one or more processors; a memory storing one or more programs configured to be executed by the one or more processors, the one or more programs including instructions for: determining an ROI and an RONI in an image to be processed; outputting first image data based on an input of the ROI; outputting second image data based on an input of the RONI; and blending the first image data and the second image data.

According to an aspect of the present disclosure, an electronic device is provided, including: one or more processors; a memory storing one or more programs configured to be executed by the one or more processors, the one or more programs including instructions for: determining a first sample ROI and a first sample RONI in a first sample image; obtaining first sample ROI enhanced image data corresponding to the first sample ROI; training a first ROI image quality enhancement model by using the first sample ROI and the first sample ROI enhanced image data; obtaining first sample RONI enhanced image data corresponding to the first sample RONI; and training an RONI image quality enhancement model by using the first sample RONI and the first sample RONI enhanced image data.

According to an aspect of the present disclosure, a non-transient computer-readable storage medium storing one or more programs is provided, the one or more programs comprising instructions, which when executed by one or more processors of an electronic device, cause the electronic device to: determine an ROI and an RONI in an image to be processed; output first image data based on an input of the ROI; output second image data based on an input of the RONI; and blend the first image data and the second image data.

According to an aspect of the present disclosure, a non-transient computer-readable storage medium storing one or more programs is provided, the one or more programs comprising instructions, which when executed by one or more processors of an electronic device, cause the electronic device to: determine a first sample ROI and a first sample RONI in a first sample image; obtain first sample ROI enhanced image data corresponding to the first sample ROI; train a first ROI image quality enhancement model by using the first sample ROI and the first sample ROI enhanced image data; obtain first sample RONI enhanced image data corresponding to the first sample RONI; and train an RONI image quality enhancement model by using the first sample RONI and the first sample RONI enhanced image data.

According to an aspect of the present disclosure, a computer program product is provided, the computer program product including a computer program, where when the computer program is executed by a processor, the method for enhancing image quality or the training method for an image quality enhancement model described above is implemented.

According to one or more embodiments of the present disclosure, an image quality enhancement model for an ROI is used for an ROI in an image to be processed, and an image quality enhancement model for an RONI is used for an RONI in the image to be processed, which makes the image enhancement processing for the ROI and the RONI more targeted, and therefore, subjective quality of the processed image or video is improved, and overall user experience of viewing the image or the video is also improved.

It should be understood that the content described in this section is not intended to identify critical or important features of the embodiments of the present disclosure, and is not used to limit the scope of the present disclosure. Other features of the present disclosure will be easily understood through the following specification.

BRIEF DESCRIPTION OF THE DRAWINGS

The accompanying drawings show embodiments and form a part of the specification, and are used to explain example implementations of the embodiments together with a written description of the specification. The embodiments shown are merely for illustrative purposes and do not limit the scope of the claims. Throughout the accompanying drawings, identical reference signs denote similar but not necessarily identical elements.

DETAILED DESCRIPTION OF THE EMBODIMENTS

Example embodiments of the present disclosure are described below in conjunction with the accompanying drawings, where various details of the embodiments of the present disclosure are included to facilitate understanding, and should only be considered as examples. Therefore, those of ordinary skill in the art should be aware that various changes and modifications can be made to the embodiments described herein, without departing from the scope of the present disclosure. Likewise, for clarity and simplicity, description of well-known functions and structures are omitted in the following description.

In the present disclosure, unless otherwise stated, the terms "first", "second", etc., used to describe various elements are not intended to limit the positional, temporal or importance relationship of these elements, but rather only to distinguish one component from another. In some examples, the first element and the second element may refer to the same instance of the element, and in some cases, based on contextual description, the first element and the second element may also refer to different instances.

The terms used in the description of the various examples in the present disclosure are merely for the purpose of describing particular examples, and are not intended to be limiting. If the number of elements is not specifically defined, it may be one or more, unless otherwise expressly indicated in the context. Moreover, term "and/or" used in the present disclosure encompasses any of and all possible combinations of listed items.

In relevant technologies, relevant methods for enhancing image quality all use a same image quality enhancement model for processing the whole picture of an image or a video, and consequently, the key regions of the enhanced image is not emphasized, and the improvement of subjective quality of the image or the video is limited. In addition, some other relevant methods only perform image enhancement processing on the ROI of the image, and no enhancement processing is performed on the RONI. Although the key region of the enhanced image is emphasized, the overall viewing experience of the image or the video is greatly worsened.

The present disclosure solves, among others, the foregoing technical problems. An image quality enhancement model for an ROI is used for an ROI in an image to be processed, and an image quality enhancement model for an RONI is used for an RONI in the image to be processed, which makes the image enhancement processing for the ROI and the RONI more targeted, and therefore, subjective quality of the processed image or video is improved, and overall user experience of viewing the image or the video is also improved.

Embodiments of the present disclosure will be described below in detail with reference to the accompanying drawings.

Figure 1:
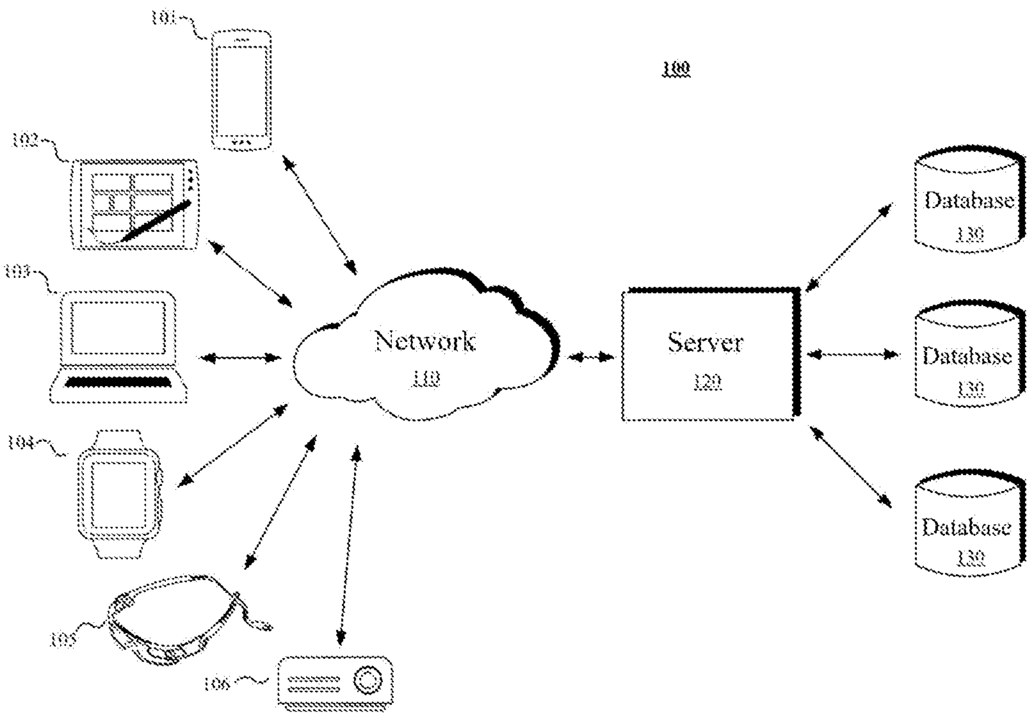
FIG. 1 is a schematic diagram of an example system in which various methods described herein can be implemented according to an embodiment of the present disclosure.

FIG. 1 is a schematic diagram of an example system 100 in which various methods and apparatuses described herein can be implemented according to an embodiment of the present disclosure. Referring to FIG. 1, the system 100 includes one or more client devices 101, 102, 103, 104, 105, and 106, a server 120, and one or more communications networks 110 that couple the one or more client devices to the server 120. The client devices 101, 102, 103, 104, 105, and 106 may be configured to execute one or more application programs.

In an embodiment of the present disclosure, the server 120 may run one or more services or software applications that enable a method for enhancing image quality or a training method for an image quality enhancement model to be performed.

In some embodiments, the server 120 may further provide other services or software applications that may include a non-virtual environment and a virtual environment. In some embodiments, these services may be provided as web-based services or cloud services, for example, provided to a user of the client device 101, 102, 103, 104, 105, and/or 106 in a software as a service (SaaS) model.

In the configuration shown in FIG. 1, the server 120 may include one or more components that implement functions performed by the server 120. These components may include software components, hardware components, or a combination thereof that can be executed by one or more processors. A user operating the client device 101, 102, 103, 104, 105, and/or 106 may sequentially use one or more client application programs to interact with the server 120, thereby utilizing the services provided by these components. It should be understood that various system configurations are possible, which may be different from those of the system 100. Therefore, FIG. 1 is an example of the system for implementing various methods described herein, and is not intended to be limiting.

The client device 101, 102, 103, 104, 105, and/or 106 may run one or more services or software applications that enable performing of the method for enhancing image quality. The user may use the client device to watch an image or a video enhanced by using the method for enhancing image quality. The client device may provide an interface that enables the user of the client device to interact with the client device. The client device may further output information to the user via the interface. Although FIG. 1 depicts only six types of client devices, those skilled in the art will understand that any number of client devices are possible in the present disclosure.

The client device 101, 102, 103, 104, 105, and/or 106 may include various types of computer devices, such as a portable handheld device, a general-purpose computer (such as a personal computer and a laptop computer), a workstation computer, a wearable device, a gaming system, a thin client, various messaging devices, and a sensor or other sensing devices. These computer devices can run various types and versions of software application programs and operating systems, such as Microsoft Windows, Apple iOS, a UNIX-like operating system, and a Linux or Linux-like operating system (e.g., Google Chrome OS); or include various mobile operating systems, such as Microsoft Windows Mobile OS, iOS, Windows Phone, and Android. The portable handheld device may include a cellular phone, a smartphone, a tablet computer, a personal digital assistant (PDA), etc. The wearable device may include a head-mounted display and other devices. The gaming system may include various handheld gaming devices, Internet-enabled gaming devices, etc. The client device can execute various application programs, such as various Internet-related application programs, communication application programs (e.g., email application programs), and short message service (SMS) application programs, and can use various communication protocols.

The network 110 may be any type of network well known to those skilled in the art, and it may use any one of a plurality of available protocols (including but not limited to TCP/IP, SNA, IPX, etc.) to support data communication. As a mere example, the one or more networks 110 may be a local area network (LAN), an Ethernet-based network, a token ring, a wide area network (WAN), the Internet, a virtual network, a virtual private network (VPN), an intranet, an extranet, a public switched telephone network (PSTN), an infrared network, a wireless network (such as Bluetooth or Wi-Fi), and/or any combination of these and/or other networks.

The server 120 may include one or more general-purpose computers, a dedicated server computer (e.g., a personal computer (PC) server, a UNIX server, or a terminal server), a blade server, a mainframe computer, a server cluster, or any other suitable arrangement and/or combination. The server 120 may include one or more virtual machines running a virtual operating system, or other computing architectures relating to virtualization (e.g., one or more flexible pools of logical storage devices that can be virtualized to maintain virtual storage devices of a server). In various embodiments, the server 120 can run one or more services or software applications that provide functions described below.

A computing unit in the server 120 can run one or more operating systems including any of the above-mentioned operating systems and any commercially available server operating system. The server 120 may further run any one of various additional server application programs and/or middle-tier application programs, including an HTTP server, an FTP server, a CGI server, a JAVA server, a database server, etc.

In some implementations, the server 120 may include one or more application programs to analyze and merge data feeds and/or event updates received from users of the client devices 101, 102, 103, 104, 105, and 106. The server 120 may further include one or more application programs to display the data feeds and/or real-time events via one or more display devices of the client devices 101, 102, 103, 104, 105, and 106.

In some implementations, the server 120 may be a server in a distributed system, or a server combined with a blockchain. The server 120 may be a cloud server, or an intelligent cloud computing server or intelligent cloud host with artificial intelligence technologies. The cloud server is a host product in a cloud computing service system, which overcomes the shortcomings of difficult management and weak service scalability in conventional physical host and virtual private server (VPS) services.

The system 100 may further include one or more databases 130. In some embodiments, these databases can be used to store data and other information. For example, one or more of the databases 130 can be used to store information such as an audio file and a video file. The data repository 130 may reside in various locations. For example, a data repository used by the server 120 may be locally in the server 120, or may be remote from the server 120 and may communicate with the server 120 via a network-based or dedicated connection. The data repository 130 may be of different types. In some embodiments, the data repository used by the server 120 may be a database, such as a relational database. One or more of these databases can store, update, and retrieve data from or to the database, in response to a command.

In some embodiments, one or more of the databases 130 may further be used by an application program to store application program data. The database used by the application program may be of different types, for example, may be a key-value repository, an object repository, or a regular repository backed by a file system.

The system 100 of FIG. 1 may be configured and operated in various manners, such that the various methods and apparatuses described according to the present disclosure can be applied.

Figure 2:
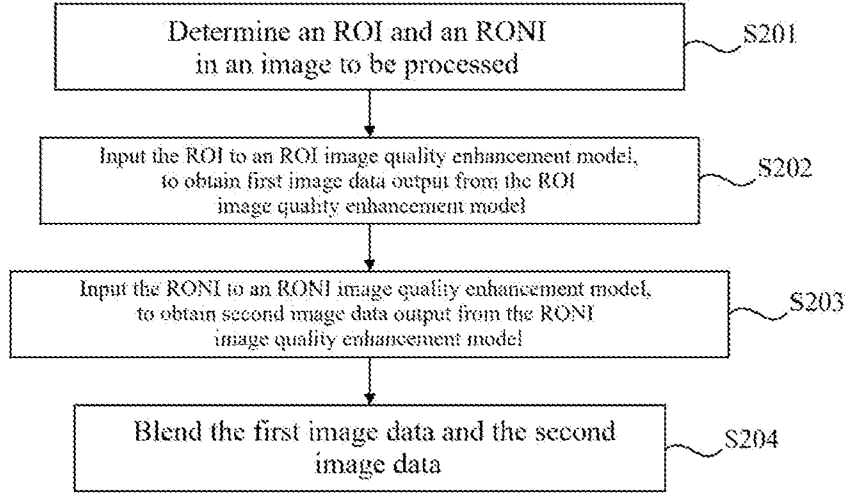
FIG. 2 is a flowchart of a method for enhancing image quality according to an example embodiment of the present disclosure.

According to an aspect of the present disclosure, a method for enhancing image quality is provided. As shown in FIG. 2, the method for enhancing image quality may include: step S201, determining an ROI (region-of-interest) and an RONI (region-of-non-interest) in an image to be processed; step S202, inputting the ROI to an ROI image quality enhancement model, to obtain first image data output from the ROI image quality enhancement model; step S203, inputting the RONI to an RONI image quality enhancement model, to obtain second image data output from the RONI image quality enhancement model; and step S204, blending the first image data and the second image data. In this way, an image quality enhancement model for an ROI is used for an ROI in an image to be processed, and an image quality enhancement model for an RONI is used for an RONI in the image to be processed, which makes the image enhancement processing for the ROI and the RONI more targeted, and therefore, subjective quality of the processed image or video is improved, and overall user experience of viewing the image or the video is also improved.

According to some embodiments, the image to be processed may be, for example, a frame in a plurality of consecutive video frames of a video. With more targeted image quality enhancement processing being performed on each frame in the video, the overall subjective quality of the video is enhanced, and the user experience of watching the video is also improved.

According to some embodiments, the ROI may be a region in the image to be processed that gains more attention from human eyes, for example, a human face, a human body, a foreground object in the picture, and other objects; and the RONI may be a region that is different from the ROI, for example, a scenery background of roads, faraway hills, oceans, and sky in the image. Usually, human eyes are more sensitive about subjective quality of the ROI, and are less sensitive about subjective quality of the RONI. Therefore, applying different image quality enhancement models to the two regions can provide more targeted enhancement of overall subjective image quality, and avoid an undesired excessive emphasis on the RONI that makes the RONI too eye-catching caused by applying a same image quality enhancement model to both regions, thereby saving computing resources.

According to some embodiments, there may be a huge difference between subjective enhancement effects of images of different categories or service scenarios when a same image quality enhancement model is used, that is, the image quality enhancement model may not be applicable across categories or service scenarios. In some embodiments, an image quality enhancement model for a human face trained using human face image data may not be applicable to image quality enhancement for a service scenario such as scenery, and vice versa. Therefore, the ROI is input to an image quality enhancement model for the ROI that is trained using image data similar to the ROI, and the RONI is input to an RONI image quality enhancement model for the RONI that is trained using image data similar to the RONI, resulting in targeted subjective quality enhancement of each region, thereby further improving overall subjective quality of an image or a video to be processed, and improving the user experience.

Figure 3:
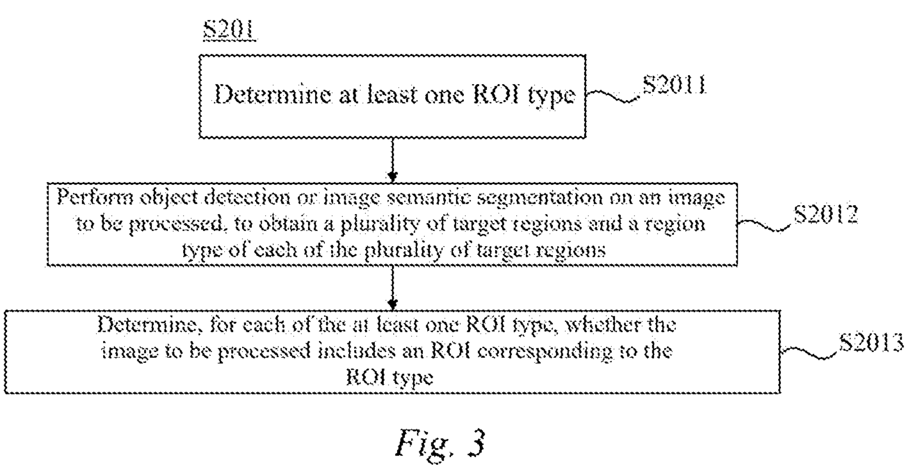
FIG. 3 is a flowchart of determining an ROI and an RONI in an image to be processed in a method for enhancing image quality according to an example embodiment of the present disclosure.

According to some embodiments, as shown in FIG. 3, step S201 of determining an ROI and an RONI in an image to be processed may include: step S2011, determining at least one ROI type; and step S2013, determining, for each of the at least one ROI type, whether the image to be processed includes an ROI corresponding to the ROI type. In some embodiments, a human body and a plant may be determined as predetermined ROI types, so that whether the image to be processed includes an ROI corresponding to a human body or an ROI corresponding to a plant can be determined.

According to some embodiments, as shown in FIG. 3, step S201 of determining an ROI and an RONI in an image to be processed may further include: step S2012, performing object detection or image semantic segmentation on the image to be processed, to obtain a plurality of target regions and a region type of each of the plurality of target regions. Step S2013 of determining, for each of the at least one ROI type, whether the image to be processed includes an ROI corresponding to the ROI type may be, for example, determining, for each of the at least one ROI type, whether the plurality of target regions include an ROI corresponding to the ROI type. In this way, by using the method of object detection or image semantic segmentation, the type of the object can be obtained along with the information of the position and the outline of the object included in the image to be processed, and the plurality of target regions and corresponding region types can be obtained more easily, and whether the target regions include an ROI corresponding to the ROI type can further be determined.

It can be understood that the "ROI" described in the present disclosure is not intended to limit a shape of the region, and is not intended to limit connectivity between and the number of regions, either. For example, a plurality of detection boxes respectively encircling a plurality of people are obtained in an image to be processed by using the method of object detection, and all the detection boxes are ROI corresponding to the region type of "human body".

After the ROI and the RONI in the image to be processed are determined, the ROI image quality enhancement model for the ROI and the image quality enhancement model for the RONI may be determined. In some example embodiments, both the ROI image quality enhancement model and the RONI image quality enhancement model are configured to perform at least one of the following operations on image data: noise suppression, image resolution increasing, detail enhancement, super-resolution, and color enhancement.

Figure 4:
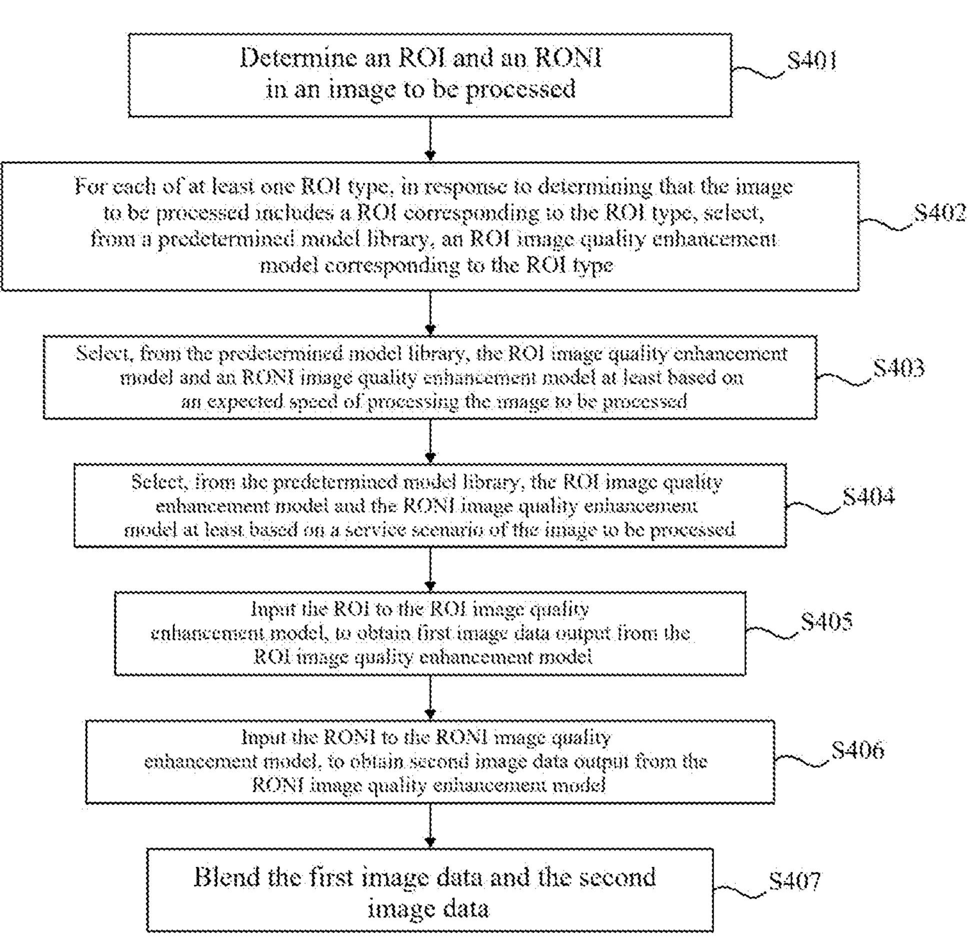
FIG. 4 is a flowchart of a method for enhancing image quality according to an example embodiment of the present disclosure.

According to some embodiments, a model library may be established, which may include a plurality of ROI image quality enhancement models respectively corresponding to a plurality of region types. The model library may be predetermined or dynamically determined. Each of the plurality of ROI image quality enhancement models is obtained by training using image data of a region type corresponding to the model. The model library may also be dynamically updated based on the trainings in the processing of the image samples. In the description herein, a predetermined model library is used as an example for descriptive purposes, which does not limit the scope of the disclosure. As shown in FIG. 4, the method for enhancing image quality may further include: step S402, for each of the at least one ROI type, in response to determining that the image to be processed includes the ROI corresponding to the ROI type, selecting, from the predetermined model library, an ROI image quality enhancement model corresponding to the ROI type. Step S401 and steps S405 to S407 in FIG. 4 are similar to operations in steps S201 to S204 in FIG. 2 respectively. Details are not described herein again.

According to some embodiments, step S405 of inputting the ROI to an ROI image quality enhancement model, to obtain first image data output from the ROI image quality enhancement model may include: inputting an ROI corresponding to each of the at least one ROI type to a corresponding ROI image quality enhancement model, to obtain first image data output from the ROI image quality enhancement model and corresponding to each of the at least one ROI type. In this way, by selecting a corresponding ROI image quality enhancement model based on an ROI type, and by inputting an ROI to the corresponding ROI image quality enhancement model, a more targeted method for enhancing image quality is achieved.

According to some embodiments, the predetermined model library may include a plurality of ROI image quality enhancement models with different complexity and a plurality of RONI image quality enhancement models with different complexity. As shown in FIG. 4, the method for enhancing image quality may further include: step S403, selecting, from the predetermined model library, the ROI image quality enhancement model and the RONI image quality enhancement model at least based on an expected processing speed for the image to be processed. In this way, by setting a plurality of image quality enhancement models with different complexity in the predetermined model library, a boarder selection of image quality enhancement models is created, and the control of the processing speed of image quality enhancement processing on an image to be processed is realized, thereby avoiding poor user experience caused by a long processing time due to excessively high model complexity, or poor subjective quality of an image or a video caused by poor processing effects due to excessively low model complexity.

According to some embodiments, complexity of the ROI image quality enhancement model selected for processing the image to be processed may be greater than complexity of the RONI image quality enhancement model selected for processing the image to be processed. In this way, it can be ensured that image quality of an ROI can be preferentially enhanced when image quality enhancement is performed on an image to be processed, and thus the subjective quality of an image or a video can still be greatly improved with limited computing resources.

According to some embodiments, the predetermined model library may include a model using a deep learning method, or may include a model using a non-deep learning method. For example, the model using a deep learning method may use, for example, a convolutional neural network, and the model using a non-deep learning method may perform mathematical modeling-based operations such as smoothing filtering, sharpening, histogram equalization, image morphology, and wavelet transform to implement image quality enhancement. It can be understood that the model using a non-deep learning method usually has lower complexity than the model using a deep learning method. In some embodiments, a model using a deep learning method with relatively high complexity may be used as the ROI image quality enhancement model, and a model using a deep learning method with relatively low complexity may be used as the RONI image quality enhancement model; or a model using a deep learning method may be used as the ROI image quality enhancement model, and a model using a non-deep learning method may be used as the RONI image quality enhancement model; or a model using a non-deep learning method with relatively high complexity may be used as the ROI image quality enhancement model, and a model using a non-deep learning method with relatively low complexity may be used as the RONI image quality enhancement model, which is not limited herein.

According to some embodiments, the predetermined model library may include a plurality of ROI image quality enhancement models respectively corresponding to a plurality of service scenarios and a plurality of RONI image quality enhancement models corresponding to a plurality of service scenarios, respectively. As shown in FIG. 4, the method for enhancing image quality may further include: step S404, selecting, from the predetermined model library, the ROI image quality enhancement model and the RONI image quality enhancement model at least based on a service scenario of the image to be processed. In this way, a plurality of models for different service scenarios are set in the predetermined model library, such that a boarder selection of image quality enhancement models is created, and more targeted image quality enhancement processing can be implemented on images to be processed in different service scenarios.

According to some embodiments, a service scenario may be of, for example, an image type or a video type. For example, different service scenarios may be of different types of movies such as documentaries, action movies, and feature movies. For example, for action movies, an image quality enhancement model that emphasizes more on actions of a character and suppresses the background may be used. For documentaries, an image quality enhancement model that better shows original colors of objects and the background may be used. For the feature movie, an image quality enhancement model that softens the appearance of characters, objects, and scenes may be used, which is not limited herein.

It can be understood that the above-mentioned scenario-models can be used either alone or in combination. For example, the predetermined model library includes 27 ROI image quality enhancement models for three ROI types, three levels of complexity, and three service scenarios, and when an image quality enhancement operation is performed on an ROI in an image to be processed, one or more models may be selected for processing based on requirements. The above description is merely an example embodiment, those skilled in the art may create a predetermined model library with more choices based on requirements, and may freely set rules for model selection, which is not limited herein.

According to some embodiments, in step S407, the first image data and second image data are blended, which may be, for example, that Poisson blending may be performed on the first image data and the second image data. In this way, by using Poisson blending, the transition at edges between the ROI and the RONI appears to be more natural, thereby further improving effects of blending the first image data and the second image data, and further improving overall subjective quality of a processed image. It can be understood that, those skilled in the art may select other blending methods based on requirements, for example, select a simpler or more complex blending method based on the amount of available computing resources, or select a more targeted blending method based on the characteristics of the image data, which is not limited herein.

Figure 5:
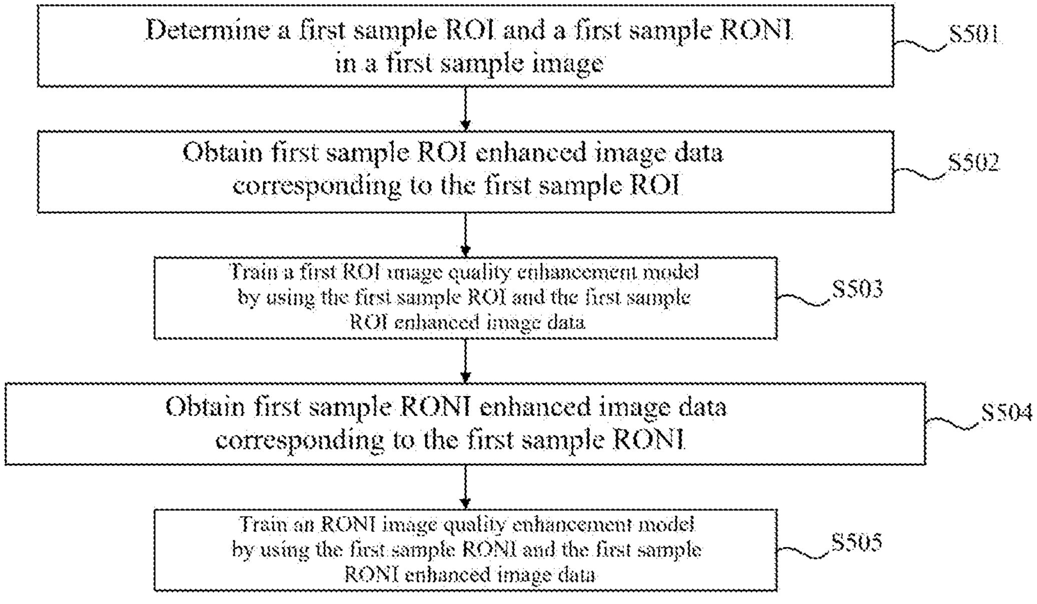
FIGS. 5 to 8 are flowcharts of a training method for an image quality enhancement model according to an example embodiment of the present disclosure.

According to an aspect of the present disclosure, a training method for an image quality enhancement model is further provided. As shown in FIG. 5, the training method may include: step S501, determining a first sample ROI and a first sample RONI in a first sample image; step S502, obtaining first sample ROI enhanced image data corresponding to the first sample ROI; step S503, training a first ROI image quality enhancement model by using the first sample ROI and the first sample ROI enhanced image data; step S504, obtaining first sample RONI enhanced image data corresponding to the first sample RONI; and step S505, training an RONI image quality enhancement model by using the first sample RONI and the first sample RONI enhanced image data. In this way, by training an ROI image quality enhancement model using the sample image data and enhanced image data of an ROI, and by training an RONI image quality enhancement model using the sample image data and enhanced image data of an RONI, the model for the ROI and the model for the RONI are more targeted in performing image quality enhancement processing, thereby improving subjective quality of an image for which image quality enhancement processing has been performed on the ROI and the RONI by using the two models, respectively, and further improving user experience of watching.

According to some embodiments, the first sample image may be, for example, a frame in a plurality of consecutive video frames of a video, and the first sample ROI enhanced image data may be, for example, image data obtained after enhancement processing on the first sample ROI by using another method.

Figure 6:
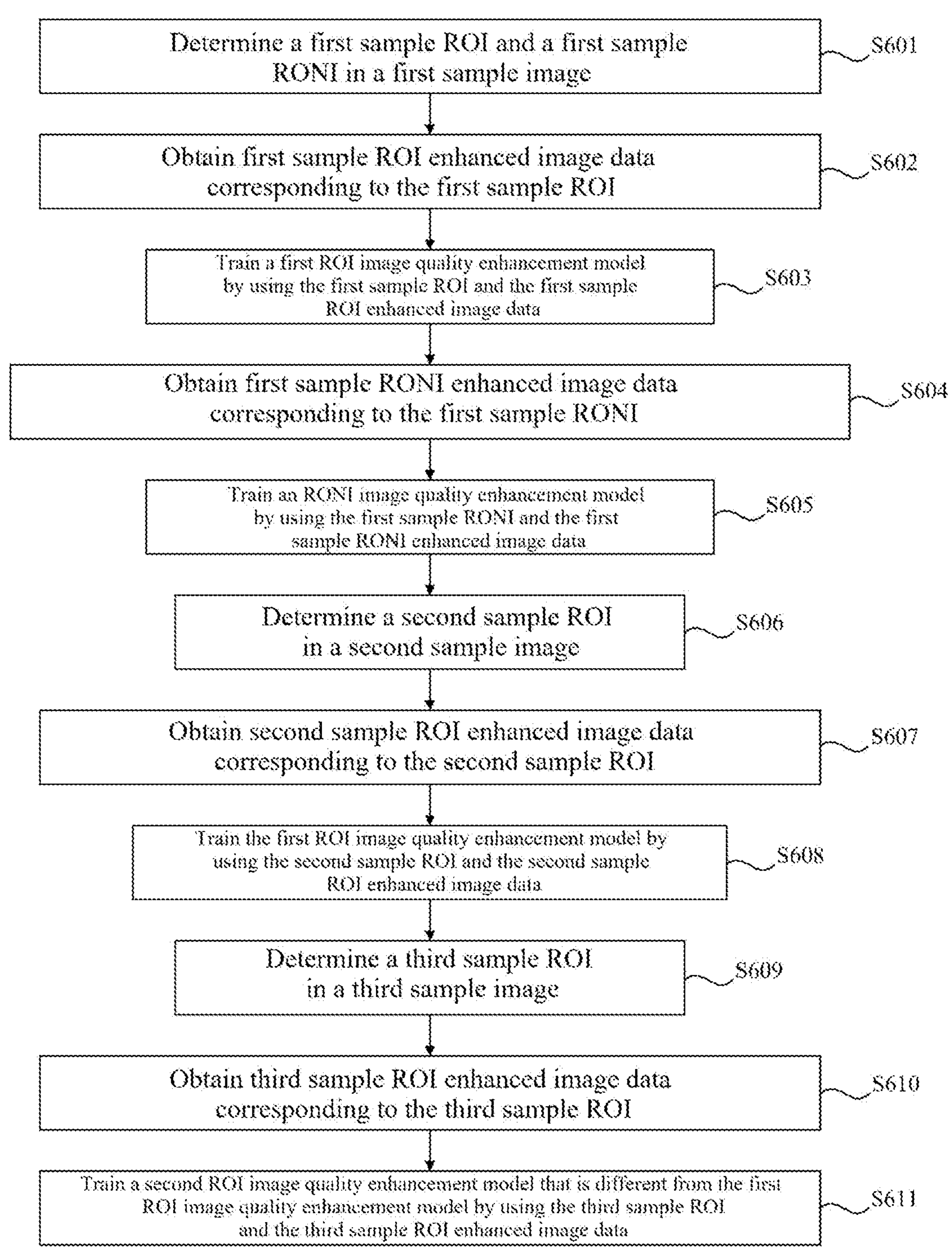

According to some embodiments, as shown in FIG. 6, the training method may further include: step S606, determining a second sample ROI in a second sample image, where a region type of the second sample ROI is the same as a region type of the first sample ROI; step S607, obtaining second sample ROI enhanced image data corresponding to the second sample ROI: step S608, training the first ROI image quality enhancement model by using the second sample ROI and second sample ROI enhanced image data; step S609, determining a third sample ROI in a third sample image, where a region type of the third sample ROI is different from the region type of the first sample ROI; step S610, obtaining third sample ROI enhanced image data corresponding to the third sample ROI; and step S611, training a second ROI image quality enhancement model that is different from the first ROI image quality enhancement model by using the third sample ROI and the third sample ROI enhanced image data. The operations of steps S601 to S605 in FIG. 6 are similar to operations in steps S501 to S505 in FIG. 5, and details are not described herein again.

In this way, image data of ROI of a same ROI type is used for training a same ROI image quality enhancement model, and image data of ROI of different ROI types is used for training different ROI image quality enhancement models, such that ROI image quality enhancement models corresponding to different ROI types can be obtained, thereby achieving a boarder selection of models when image quality enhancement processing is performed on an image to be processed, and achieving more targeted processing on different types of ROI, and further improving subjective quality of a processed image and improving an impression of a user. It can be understood that, different ROIs corresponding to different ROI types in the first sample image may be used for training different image quality enhancement models, which is not limited herein.

Figure 7:
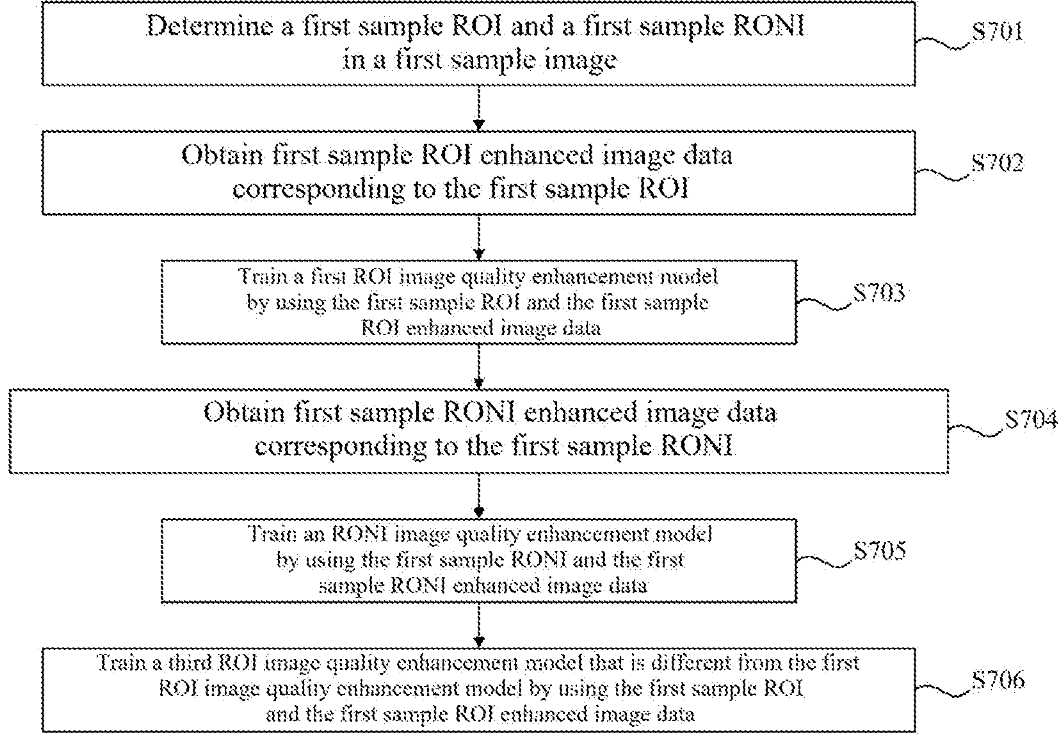

According to some embodiments, as shown in FIG. 7, the training method may further include: step S706, training a third ROI image quality enhancement model that is different from the first ROI image quality enhancement model by using the first sample ROI and the first sample ROI enhanced image data, where complexity of the third ROI image quality enhancement model is different from complexity of the first ROI image quality enhancement model. The operations of steps S701 to S705 in FIG. 7 are similar to operations in steps S501 to S505 in FIG. 5, and details are not described herein again. In this way, a same sample image is used for training a plurality of ROI image quality enhancement models with different complexity, enabling a richer model selection range when performing image enhancement processing on the image to be processed, and realizing control over the speed of the image quality enhancement process.

Figure 8:
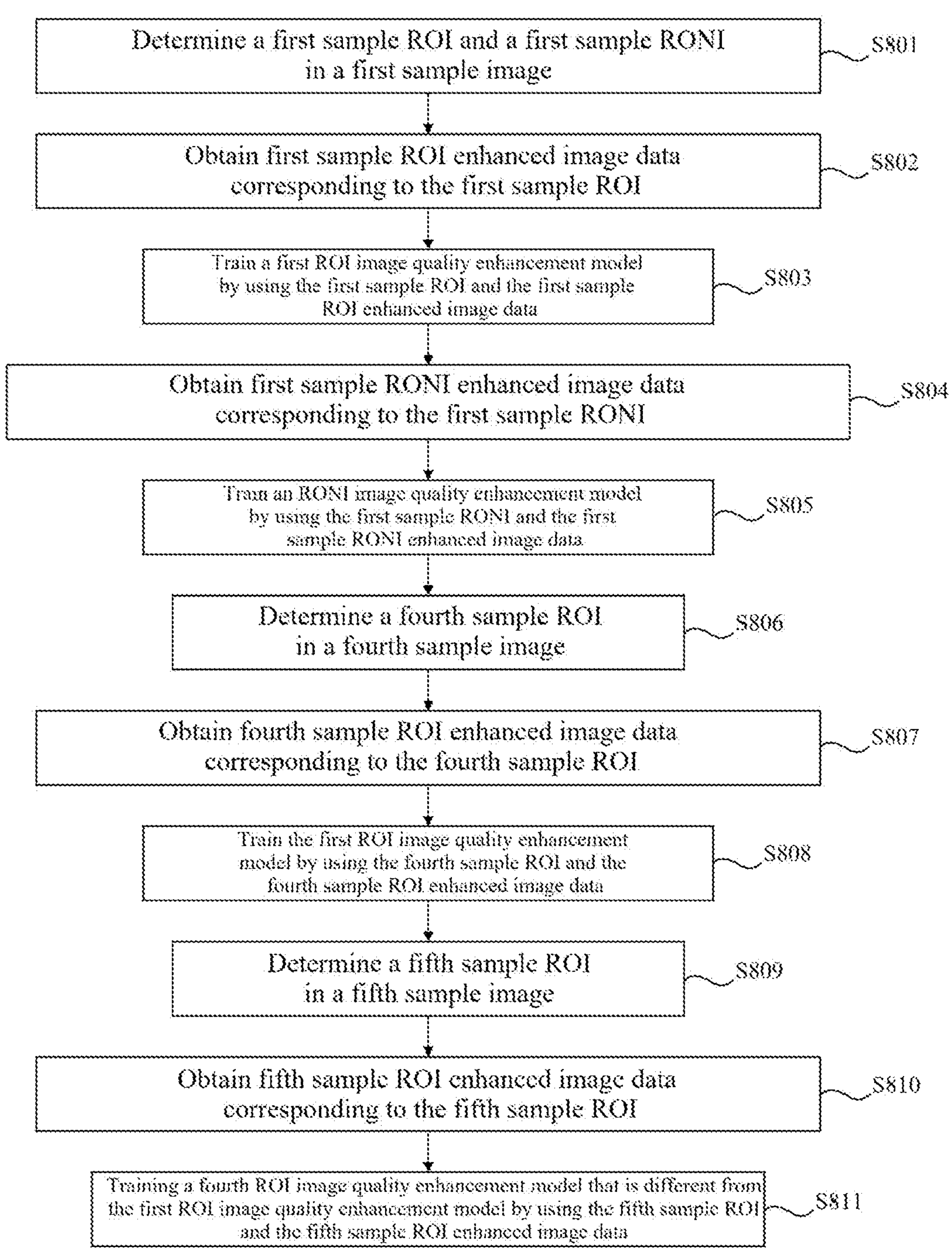

According to some embodiments, as shown in FIG. 8, the training method may further include: step S806, determining a fourth sample ROI in a fourth sample image, where a service scenario of the fourth sample image is the same as a service scenario of the first sample image; step S807, obtaining fourth sample ROI enhanced image data corresponding to the fourth sample ROI; step S808, training the first ROI image quality enhancement model by using the fourth sample ROI and the fourth sample ROI enhanced image data; step S809, determining a fifth sample ROI in a fifth sample image, where a service scenario of the fifth sample image is different from the service scenario of the first sample image; step S810, obtaining fifth sample ROI enhanced image data corresponding to the fifth sample ROI; and step S811, training a fourth ROI image quality enhancement model that is different from the first ROI image quality enhancement model by using the fifth sample ROI and the fifth sample ROI enhanced image data. In this way, sample images of a same service scenario are used for training a same ROI image quality enhancement model, and sample images of different service scenarios are used for training different ROI image quality enhancement models, such that ROI image quality enhancement models corresponding to different service scenarios can be obtained, thereby achieving a richer model selection range when performing image quality enhancement processing on the image to be processed, achieving more targeted processing on image data in different service scenarios, and further improving subjective quality of the processed image and improving the user experience.

Figure 9:
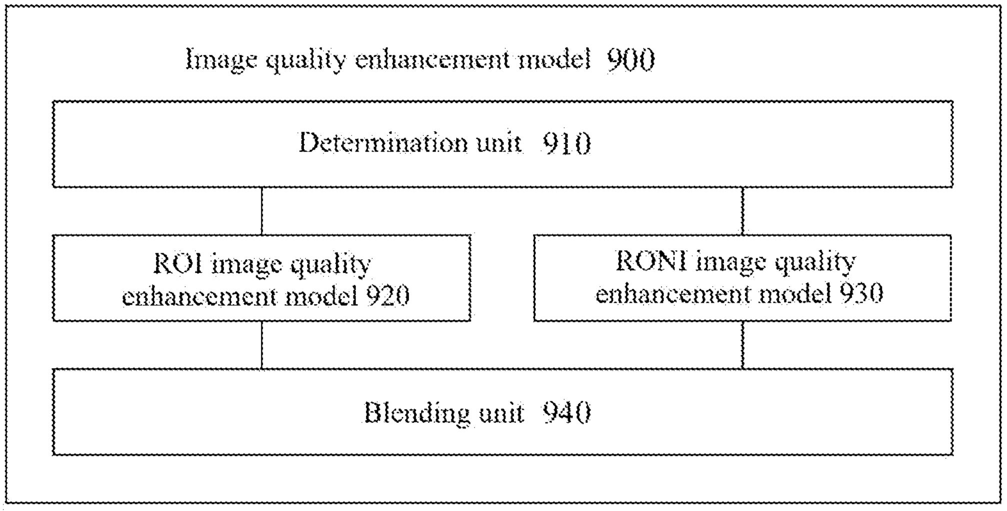
FIG. 9 is a structural block diagram of an image quality enhancement model according to an embodiment of the present disclosure.

According to an aspect of the present disclosure, an image quality enhancement model is further provided. As shown in FIG. 9, the image quality enhancement model 900 may include: a determination unit 910 configured to determine an ROI and an RONI in an image to be processed; an ROI image quality enhancement model 920 configured to output first image data based on an input of the ROI; an RONI image quality enhancement model 930 configured to output second image data based on an input of the RONI; and a blending unit 940 configured to blend the first image data and the second image data.

The operations of the unit 910 to the unit 940 of the image quality enhancement model 900 are similar to operations in steps S201 to S204 described above, and details are not described herein again.

Figure 10:
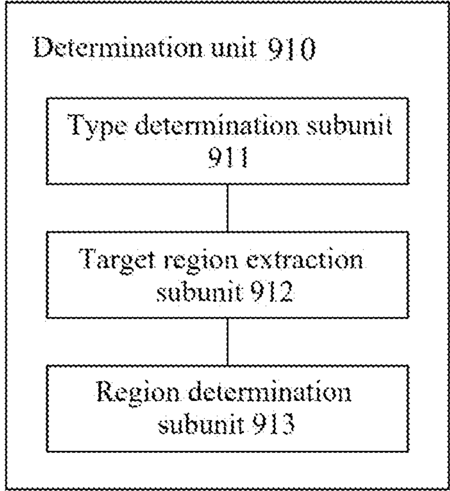
FIG. 10 is a structural block diagram of a determination unit in an image quality enhancement model according to an embodiment of the present disclosure.

According to some embodiments, as shown in FIG. 10, the determination unit 910 may include: a type determination subunit 911 configured to determine at least one ROI type; and a region determination subunit 913 configured to determine, for each of the at least one ROI type, whether the image to be processed includes an ROI corresponding to the ROI type.

According to some embodiments, as shown in FIG. 10, the determination unit 910 may further include: a target region extraction subunit 912 configured to perform object detection or image semantic segmentation on the image to be processed, to obtain a plurality of target regions and a region type of each of the plurality of target regions. The region determination subunit is configured to: for each of the at least one ROI type, determine whether the plurality of target regions include an ROI corresponding to the ROI type.

Figure 11:
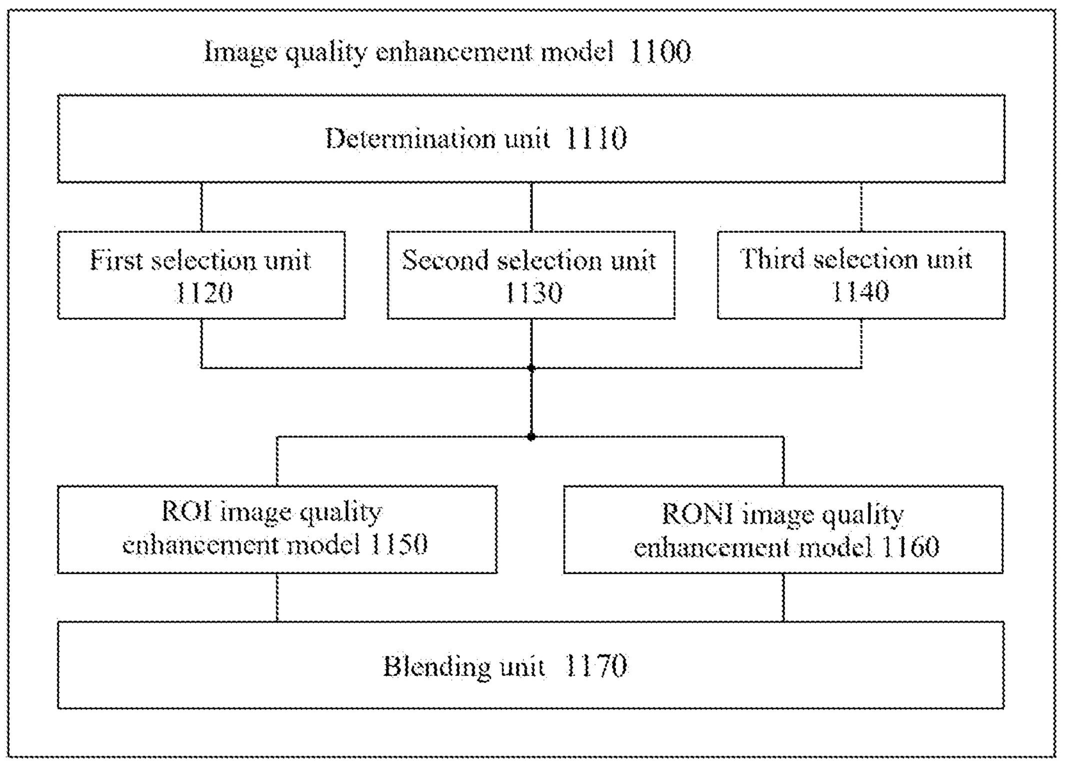
FIG. 11 is a structural block diagram of an image quality enhancement model according to an embodiment of the present disclosure.

According to some embodiments, as shown in FIG. 11, an image quality enhancement model 1100 may further include: a first selection unit 1120 configured to: for each of the at least one ROI type, in response to determining that the image to be processed includes the ROI corresponding to the ROI type, select, from a predetermined model library, an ROI image quality enhancement model corresponding to the ROI type, where the predetermined model library includes a plurality of ROI image quality enhancement models respectively corresponding to a plurality of region types. The operations of the unit 1110 and the unit 1150 to the unit 1170 in FIG. 11 are similar to operations of the unit 910 to the unit 940 in FIG. 9, and details are not described herein again.

According to some embodiments, as shown in FIG. 11, the image quality enhancement model 1100 may further include: a second selection unit 1130 configured to select, from a predetermined model library, the ROI image quality enhancement model and the RONI image quality enhancement model at least based on an expected processing speed for the image to be processed, where the predetermined model library includes a plurality of image quality enhancement models with different complexity for the ROI and a plurality of image quality enhancement models with different complexity for the RONI.

According to some embodiments, complexity of the ROI image quality enhancement model selected for processing the image to be processed is greater than complexity of the RONI image quality enhancement model selected for processing the image to be processed.

According to some embodiments, as shown in FIG. 11, the image quality enhancement model 1100 may further include: a third selection unit 1140 configured to select, from a predetermined model library, the ROI image quality enhancement model and the RONI image quality enhancement model at least based on a service scenario of the image to be processed, where the predetermined model library includes a plurality of image quality enhancement models for the ROI corresponding to a plurality of service scenarios, respectively, and a plurality of image quality enhancement models for the RONI corresponding to the plurality of service scenarios, respectively.

Figure 12:
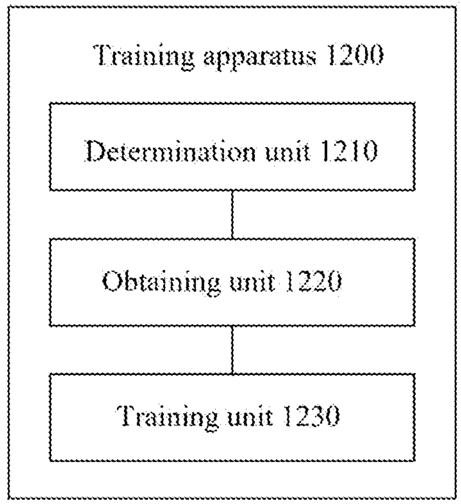
FIG. 12 is a structural block diagram of a training apparatus for an image quality enhancement model according to an embodiment of the present disclosure.

According to an aspect of the present disclosure, a training apparatus for an image quality enhancement model is further provided. As shown in FIG. 12, the training apparatus 1200 may include: a determination unit 1210 configured to determine a first sample ROI and a first sample RONI in a first sample image; an obtaining unit 1220 configured to obtain first sample ROI enhanced image data corresponding to the first sample ROI; and a training unit 1230 configured to train a first ROI image quality enhancement model by using the first sample ROI and the first sample ROI enhanced image data. The obtaining unit 1220 is further configured to obtain first sample RONI enhanced image data corresponding to the first sample RONI. The training unit 1230 is further configured to train an RONI image quality enhancement model by using the first sample RONI and the first sample RONI enhanced image data.

According to some embodiments, the determination unit 1210 is further configured to determine a second sample ROI in a second sample image, and a region type of the second sample ROI is the same as a region type of the first sample ROI. The obtaining unit 1220 is further configured to obtain second sample ROI enhanced image data corresponding to the second sample ROI. The training unit 1230 is further configured to train the first ROI image quality enhancement model by using the second sample ROI and second sample ROI enhanced image data. The determination unit 1210 is further configured to determine a third sample ROI in a third sample image, and a region type of the third sample ROI is different from the region type of the first sample ROI. The obtaining unit 1220 is further configured to obtain third sample ROI enhanced image data corresponding to the third sample ROI. The training unit 1230 is further configured to train a second ROI image quality enhancement model that is different from the first ROI image quality enhancement model by using the third sample ROI and the third sample ROI enhanced image data.

According to some embodiments, the training unit 1230 is further configured to train a third ROI image quality enhancement model that is different from the first ROI image quality enhancement model by using the first sample ROI and the first sample ROI enhanced image data. The complexity of the third ROI image quality enhancement model is different from the complexity of the first ROI image quality enhancement model.

According to some embodiments, the determination unit 1210 is further configured to determine a fourth sample ROI in a fourth sample image, and a service scenario of the fourth sample image is the same as a service scenario of the first sample image. The obtaining unit 1220 is further configured to obtain fourth sample ROI enhanced image data corresponding to the fourth sample ROI. The training unit 1230 is further configured to train the first ROI image quality enhancement model by using the fourth sample ROI and the fourth sample ROI enhanced image data. The determination unit 1210 is further configured to determine a fifth sample ROI in a fifth sample image, and a service scenario of the fifth sample image is different from the service scenario of the first sample image. The obtaining unit 1220 is further configured to obtain fifth sample ROI enhanced image data corresponding to image data of the fifth sample ROI. The training unit 1230 is further configured to train a fourth ROI image quality enhancement model that is different from the first ROI image quality enhancement model by using the fifth sample ROI and the fifth sample ROI enhanced image data.

According to an embodiment of the present disclosure, an electronic device, a readable storage medium, and a computer program product are further provided.

Figure 13:
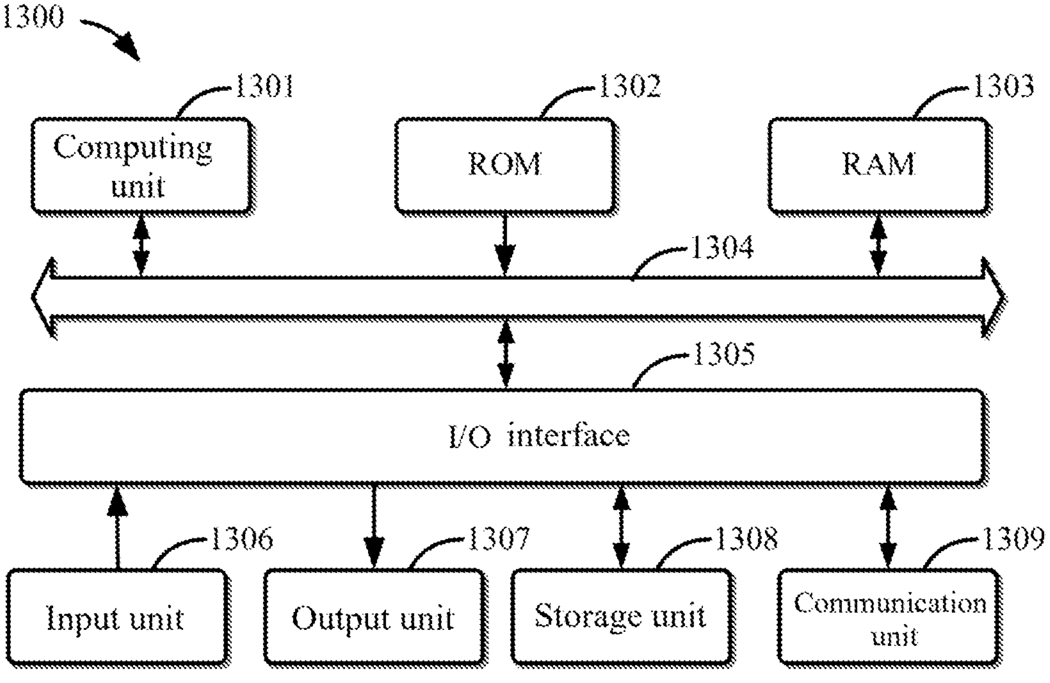
FIG. 13 is a structural block diagram of an example electronic device that can be used to implement an embodiment of the present disclosure.

Referring to FIG. 13, a structural block diagram of an electronic device 1300 that can serve as a server or a client of the present disclosure is now described, which is an example of a hardware device that can be applied to various aspects of the present disclosure. The electronic device is intended to represent various forms of digital electronic computer devices, such as a laptop computer, a desktop computer, a workstation, a personal digital assistant, a server, a blade server, a mainframe computer, and other suitable computers. The electronic device may further represent various forms of mobile apparatuses, such as a personal digital assistant, a cellular phone, a smartphone, a wearable device, and other similar computing apparatuses. The components shown herein, their connections and relationships, and their functions are merely examples, and are not intended to limit the implementation of the present disclosure described and/or required herein.

As shown in FIG. 13, the device 1300 includes a computing unit 1301, which may perform various appropriate actions and processing according to a computer program stored in a read-only memory (ROM) 1302 or a computer program loaded from a storage unit 1308 to a random access memory (RAM) 1303. The RAM 1303 may further store various programs and data required for the operation of the device 1300. The computing unit 1301, the ROM 1302, and the RAM 1303 are connected to each other through a bus 1304. An input/output (I/O) interface 1305 is also connected to the bus 1304.

A plurality of components in the device 1300 are connected to the I/O interface 1305, including: an input unit 1306, an output unit 1307, the storage unit 1308, and a communication unit 1309. The input unit 1306 may be any type of device capable of entering information to the device 1300. The input unit 1306 can receive entered digit or character information, and generate a key signal input related to user settings and/or function control of the electronic device, and may include, but is not limited to, a mouse, a keyboard, a touchscreen, a trackpad, a trackball, a joystick, a microphone, and/or a remote controller. The output unit 1307 may be any type of device capable of presenting information, and may include, but is not limited to, a display, a speaker, a video/audio output terminal, a vibrator, and/or a printer. The storage unit 1308 may include, but is not limited to, a magnetic disk and an optical disc. The communication unit 1309 allows the device 1300 to exchange information/data with other devices via a computer network such as the Internet and/or various telecommunications networks, and may include, but is not limited to, a modem, a network interface card, an infrared communication device, a wireless communication transceiver and/or a chipset, e.g., a Bluetooth™ device, a 802.11 device, a Wi-Fi device, a WiMAX device, a cellular communication device and/or the like.

The computing unit 1301 may be various general-purpose and/or special-purpose processing components with processing and computing capabilities. Some examples of the computing unit 1301 include, but are not limited to, a central processing unit (CPU), a graphics processing unit (GPU), various dedicated artificial intelligence (AI) computing chips, various computing units that run machine learning model algorithms, a digital signal processor (DSP), and any appropriate processor, controller, microcontroller, etc. The computing unit 1301 performs various methods and processing described above, for example, the method for enhancing image quality or the training method for an image quality enhancement model. For example, in some embodiments, the method for enhancing image quality or the training method for an image quality enhancement model may be implemented as a computer software program, which is tangibly contained in a machine-readable medium, such as the storage unit 1308. In some embodiments, a part or all of the computer program may be loaded and/or installed onto the device 1300 via the ROM 1302 and/or the communication unit 1309. When the computer program is loaded to the RAM 1303 and executed by the computing unit 1301, one or more steps of the method for enhancing image quality or the training method for an image quality enhancement model described above can be performed. Alternatively, in other embodiments, the computing unit 1301 may be configured, by any other suitable means (for example, by means of firmware), to perform the method for enhancing image quality or the training method for an image quality enhancement model.

Various implementations of the systems and technologies described herein above can be implemented in a digital electronic circuit system, an integrated circuit system, a field programmable gate array (FPGA), an application-specific integrated circuit (ASIC), an application-specific standard product (ASSP), a system-on-chip (SOC) system, a complex programmable logical device (CPLD), computer hardware, firmware, software, and/or a combination thereof. These various implementations may include: the systems and technologies are implemented in one or more computer programs, where the one or more computer programs may be executed and/or interpreted on a programmable system including at least one programmable processor. The programmable processor may be a dedicated or general-purpose programmable processor that can receive data and instructions from a storage system, at least one input apparatus, and at least one output apparatus, and transmit data and instructions to the storage system, the at least one input apparatus, and the at least one output apparatus.

Program codes used to implement the method of the present disclosure can be written in any combination of one or more programming languages. These program codes may be provided for a processor or a controller of a general-purpose computer, a special-purpose computer, or other programmable data processing apparatuses, such that when the program codes are executed by the processor or the controller, the functions/operations specified in the flowcharts and/or block diagrams are implemented. The program codes may be completely executed on a machine, or partially executed on a machine, or may be, as an independent software package, partially executed on a machine and partially executed on a remote machine, or completely executed on a remote machine or a server.

In the context of the present disclosure, the machine-readable medium may be a tangible medium, which may contain or store a program for use by an instruction execution system, apparatus, or device, or for use in combination with the instruction execution system, apparatus, or device. The machine-readable medium may be a machine-readable signal medium or a machine-readable storage medium. The machine-readable medium may include, but is not limited to, an electronic, magnetic, optical, electromagnetic, infrared, or semiconductor system, apparatus, or device, or any suitable combination thereof. More specific examples of the machine-readable storage medium may include an electrical connection based on one or more wires, a portable computer disk, a hard disk, a random access memory (RAM), a read-only memory (ROM), an erasable programmable read-only memory (EPROM or flash memory), an optical fiber, a portable compact disk read-only memory (CD-ROM), an optical storage device, a magnetic storage device, or any suitable combination thereof.

In order to provide interaction with a user, the systems and technologies described herein can be implemented on a computer which has: a display apparatus (for example, a cathode-ray tube (CRT) or a liquid crystal display (LCD) monitor) configured to display information to the user; and a keyboard and pointing apparatus (for example, a mouse or a trackball) through which the user can provide an input to the computer. Other types of apparatuses can also be used to provide interaction with the user; for example, feedback provided to the user can be any form of sensory feedback (for example, visual feedback, auditory feedback, or tactile feedback), and an input from the user can be received in any form (including an acoustic input, voice input, or tactile input).

The systems and technologies described herein can be implemented in a computing system (for example, as a data server) including a backend component, or a computing system (for example, an application server) including a middleware component, or a computing system (for example, a user computer with a graphical user interface or a web browser through which the user can interact with the implementation of the systems and technologies described herein) including a frontend component, or a computing system including any combination of the backend component, the middleware component, or the frontend component. The components of the system can be connected to each other through digital data communication (for example, a communications network) in any form or medium. Examples of the communications network include: a local area network (LAN), a wide area network (WAN), and the Internet.

A computer system may include a client and a server. The client and the server are generally far away from each other and usually interact through a communications network. A relationship between the client and the server is generated by computer programs running on respective computers and having a client-server relationship with each other. The server may be a cloud server, which is also referred to as a cloud computing server or a cloud host, and is a host product in a cloud computing service system for overcoming defects of difficult management and weak business expansion in conventional physical hosts and VPS ("Virtual Private Server", or "VPS" for short) services. The server may alternatively be a server in a distributed system, or a server combined with a blockchain.

It should be understood that steps may be reordered, added, or deleted based on the various forms of procedures shown above. For example, the steps recorded in the present disclosure can be performed in parallel, in order, or in a different order, provided that the desired result of the technical solutions disclosed in the present disclosure can be achieved, which is not limited herein.

Although the embodiments or examples of the present disclosure have been described with reference to the accompanying drawings, it should be understood that the methods, systems, and devices described above are merely example embodiments or examples, and the scope of the present invention is not limited by the embodiments or examples, but only defined by the appended authorized claims and equivalent scopes thereof. Various elements in the embodiments or examples may be omitted or substituted by equivalent elements thereof. Moreover, the steps may be performed in an order different from that described in the present disclosure. Further, various elements in the embodiments or examples may be combined in various ways. It is important that, as the technology evolves, many elements described herein may be replaced with equivalent elements that appear after the present disclosure.

The various embodiments described above can be combined to provide further embodiments. All of the U.S. patents, U.S. patent application publications, U.S. patent applications, foreign patents, foreign patent applications and non-patent publications referred to in this specification and/or listed in the Application Data Sheet are incorporated herein by reference, in their entirety. Aspects of the embodiments can be modified, if necessary to employ concepts of the various patents, applications and publications to provide yet further embodiments.

These and other changes can be made to the embodiments in light of the above-detailed description. In general, in the following claims, the terms used should not be construed to limit the claims to the specific embodiments disclosed in the specification and the claims, but should be construed to include all possible embodiments along with the full scope of equivalents to which such claims are entitled. Accordingly, the claims are not limited by the disclosure.

What is claimed is:

1. A method for enhancing image quality, comprising:

determining a region-of-interest (ROI) and a region-of-non-interest (RONI) in an image to be processed, wherein the ROI is a foreground object determined by performing one or more of object detection or image semantic segmentation on the image to be processed, and the RONI is a region of the image to be processed excluding the ROI;

selecting, from a model library, an ROI image quality enhancement model and an RONI image quality enhancement model at least based on an expected speed for processing the image to be processed, wherein the ROI image quality enhancement model uses a deep-learning method, and the RONI image quality enhancement model uses a non-deep-learning method, wherein the non-deep-learning method comprises at least one of: smoothing filtering, sharpening, histogram equalization, image morphology, and wavelet transform, wherein complexity of the ROI image quality enhancement model selected for processing the image to be processed is greater than complexity of the RONI image quality enhancement model selected for processing the image to be processed;

inputting the ROI to the ROI image quality enhancement model, to obtain first image data output from the ROI image quality enhancement model;

inputting the RONI to the RONI image quality enhancement model, to obtain second image data output from the RONI image quality enhancement model; and performing a Poisson blending on the first image data and the second image data.

2. The method according to claim 1, wherein the determining the ROI and the RONI in the image to be processed comprises:

determining at least one ROI type; and determining, for each of the at least one ROI type, whether the image to be processed includes an ROI corresponding to the ROI type, wherein the method further comprises:

for each of the at least one ROI type, in response to determining that the image to be processed includes the ROI corresponding to the ROI type, selecting, from a model library, an ROI image quality enhancement model corresponding to the ROI type, wherein the model library includes a plurality of ROI image quality enhancement models corresponding to a plurality of ROI types, respectively.

3. The method according to claim 1, wherein the model library includes a plurality of ROI image quality enhancement models with different complexity and a plurality of RONI image quality enhancement models with different complexity.

4. The method according to claim 1, further comprising:

selecting, from a model library, the ROI image quality enhancement model and the RONI image quality enhancement model at least based on a service scenario of the image to be processed, wherein the model library includes a plurality of ROI image quality enhancement models corresponding to a plurality of service scenarios, respectively, and a plurality of RONI image quality enhancement models corresponding to the plurality of service scenarios, respectively.

5. The method according to claim 2, wherein the determining the ROI and the RONI in the image to be processed further comprises:

performing one or more of object detection or image semantic segmentation on the image to be processed, to obtain a plurality of target regions and a region type of each of the plurality of target regions, and determining, for each ROI type of the at least one ROI type, whether the plurality of target regions include an ROI corresponding to the ROI type.

6. The method according to claim 2, wherein the model library includes a trained first ROI image quality enhancement model and a trained first RONI image quality enhancement model, and the method further comprising:

determining a first sample region-of-interest (ROI) and a first sample region-of-non-interest (RONI) in a first sample image;

obtaining first sample ROI enhanced image data corresponding to the first sample ROI;

training a first ROI image quality enhancement model by using the first sample ROI and the first sample ROI enhanced image data, to obtain a trained first ROI image quality enhancement model;

obtaining first sample RONI enhanced image data corresponding to the first sample RONI; and training an RONI image quality enhancement model by using the first sample RONI and the first sample RONI enhanced image data, to obtain a trained first RONI image quality enhancement model.

7. The method according to claim 6, wherein the model library further includes a trained second ROI image quality enhancement model, and the method further comprising:

determining a second sample ROI in a second sample image, wherein a region type of the second sample ROI is same as a region type of the first sample ROI;

obtaining second sample ROI enhanced image data corresponding to the second sample ROI;

further training the trained first ROI image quality enhancement model by using the second sample ROI and second sample ROI enhanced image data;

determining a third sample ROI in a third sample image, wherein a region type of the third sample ROI is different from the region type of the first sample ROI;

obtaining third sample ROI enhanced image data corresponding to the third sample ROI; and training a second ROI image quality enhancement model that is different from the first ROI image quality enhancement model by using the third sample ROI and the third sample ROI enhanced image data, to obtain a trained second ROI image quality enhancement model.

8. The method according to claim 6, wherein the model library further includes a trained third ROI image quality enhancement model, and the method further comprising:

training a third ROI image quality enhancement model that is different from the first ROI image quality enhancement model by using the first sample ROI and the first sample ROI enhanced image data, to obtain a trained third ROI image quality enhancement model, wherein complexity of the third ROI image quality enhancement model is different from complexity of the first ROI image quality enhancement model.

9. The method according to claim 6, wherein the model library further includes a trained fourth ROI image quality enhancement model, and the method further comprising:

determining a fourth sample ROI in a fourth sample image, wherein a service scenario of the fourth sample image is same as a service scenario of the first sample image;

obtaining fourth sample ROI enhanced image data corresponding to the fourth sample ROI;

training the trained first ROI image quality enhancement model by using the fourth sample ROI and the fourth sample ROI enhanced image data;

determining a fifth sample ROI in a fifth sample image, wherein a service scenario of the fifth sample image is different from the service scenario of the first sample image;

obtaining fifth sample ROI enhanced image data corresponding to the fifth sample ROI; and training a fourth ROI image quality enhancement model that is different from the first ROI image quality enhancement model by using the fifth sample ROI and the fifth sample ROI enhanced image data, to obtain a trained fourth ROI image quality enhancement model.

10. An electronic device, comprising:

one or more processors;

a memory storing one or more programs configured to be executed by the one or more processors, the one or more programs comprising instructions for:

determining a region-of-interest (ROI) and a region-of-non-interest (RONI) in an image to be processed, wherein the ROI is a foreground object determined by performing one or more of object detection or image semantic segmentation on the image to be processed, and the RONI is a region of the image to be processed excluding the ROI;

selecting, from a model library, an ROI image quality enhancement model and an RONI image quality enhancement model at least based on an expected speed for processing the image to be processed, wherein the ROI image quality enhancement model uses a deep-learning method, and the RONI image quality enhancement model uses a non-deep-learning method, wherein the non-deep-learning method comprises at least one of: smoothing filtering, sharpening, histogram equalization, image morphology, and wavelet transform, wherein complexity of the ROI image quality enhancement model selected for processing the image to be processed is greater than complexity of the RONI image quality enhancement model selected for processing the image to be processed;

inputting the ROI to the ROI image quality enhancement model, to obtain first image data output from the ROI image quality enhancement model;

inputting the RONI to the RONI image quality enhancement model, to obtain second image data output from the RONI image quality enhancement model; and performing a Poisson blending on the first image data and the second image data.

11. The electronic device according to claim 10, wherein the determining the ROI and the RONI in the image to be processed comprises:

determining at least one ROI type; and determining, for each of the at least one ROI type, whether the image to be processed includes an ROI corresponding to the ROI type, wherein the one or more programs comprising instructions for:

for each of the at least one ROI type, in response to determining that the image to be processed includes the ROI corresponding to the ROI type, selecting, from a model library, an ROI image quality enhancement model corresponding to the ROI type, wherein the model library includes a plurality of ROI image quality enhancement models corresponding to a plurality of ROI types, respectively.

12. The electronic device according to claim 10, wherein the model library includes a plurality of image quality enhancement models with different complexity for the ROI and a plurality of image quality enhancement models with different complexity for the RONI.

13. The electronic device according to claim 10, wherein the one or more programs comprising instructions for:

selecting, from a model library, the ROI image quality enhancement model and the RONI image quality enhancement model at least based on a service scenario of the image to be processed, wherein the model library includes a plurality of image quality enhancement models for the ROI corresponding to a plurality of service scenarios, respectively, and a plurality of image quality enhancement models for the RONI corresponding to the plurality of service scenarios, respectively.

14. The electronic device according to claim 11, wherein the determining the ROI and the RONI in the image to be processed further comprises:

performing one or more of object detection or image semantic segmentation on the image to be processed, to obtain a plurality of target regions and a region type of each of the plurality of target regions, for each of the at least one ROI type, determining whether the plurality of target regions include an ROI corresponding to the ROI type.

* * * * *